Dec. 18, 1945.  G. A. TINNERMAN  2,391,046
FASTENING DEVICE
Original Filed Feb. 23, 1939

INVENTOR.
Geo. A. Tinnerman,
BY Bates, Teare & McBean,
Attorneys.

Patented Dec. 18, 1945

2,391,046

UNITED STATES PATENT OFFICE 2,391,046

FASTENING DEVICE

George A. Tinnerman, Cleveland, Ohio, assignor to Tinnerman Products, Inc., Cleveland, Ohio, a corporation of Ohio Application February 23, 1939, Serial No. 257,900, now Patent No. 2,266,832, dated December 23, 1941, which is a division of application Serial No. 93,679, July 31, 1936, now Patent No. 2,159,573, dated May 23, 1939. Divided and this application August 16, 1941, Serial No. 407,181

2 Claims. (Cl. 85—32)

The present application is a division of my copending application, Serial No. 257,900 filed February 23, 1939 (now Patent No. 2,266,832 issued December 23, 1941), which in turn constituted a division of application Serial No. 93,679, filed July 31, 1936, now Patent No. 2,159,573 issued May 23, 1939.

This invention relates to fastening devices and particularly to a device for holding a nut firmly in position for receiving a threaded bolt. There are many instances, especially in blind locations, where a standard nut is desired, but where the operator either cannot hold it in place while the bolt is being inserted, or cannot thereafter hold it against rotation during the final tightening operation.

An effort has been made to retain a nut in bolt receiving position by welding it to one of the parts, but such method is expensive, and is objectionable in that the nut cannot be moved a slight distance to compensate for misalignment of the opening in the two parts that are to be connected together.

An object of the present invention is to make a device which can be readily attached to one of the parts to be joined, and which will be so formed that it will hold the nut firmly in bolt receiving position. The attachment may take any one of several different forms, but in each case it comprises a holder which is frictionally held by spring tension onto one of the parts, and in each case, has provision thereon for holding a nut against rotation.

A more specific object of my present invention is the provision of a preformed hook or snap carrier for a nut, which can be pressed or snapped into an aperture in the supporting member to be joined, to provide self-retaining means for supporting the nut in bolt receiving position.

Another feature of the invention comprises a nut carrier so formed as to hold the nut slightly away from the member to be joined but under spring constraint, so that the nut will have a pulling action on the bolt to effect a frictional restraint against the unscrewing of the bolt.

Figure 1:
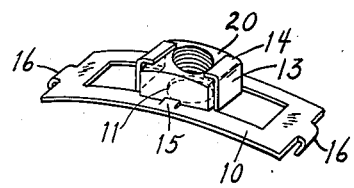
Figure 2:
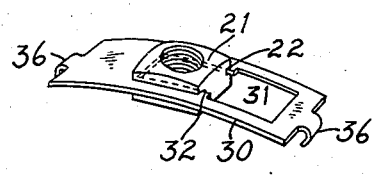
Figure 3:
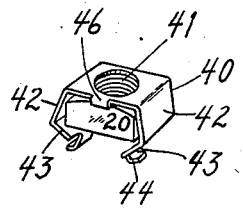
Figure 4:
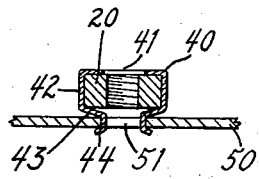

In the drawing, Figs. 1, 2 and 3 are perspective views of different forms which the fastening devices may have; Fig. 4 is a sectional view through the nut and fastener which is shown in Fig. 3.

Referring now to Fig. 1, the nut holder there shown comprises a body of sheet-metal, which is indicated at 10, and which is arched upwardly from end to end. The mid-portion of the body has a bolt receiving opening 11 in registration with the bolt opening in a nut 20. The nut retaining means may comprise tongues 13, each of which is struck upwardly from the body, and each of which has an inturned flange 14 adjacent the upper end thereof. The tongues are sufficiently close to exert spring pressure upon two side walls of the nut, so as to hold it securely in place. If desired, additional tongues 15 may be struck upwardly, one on each side of the body, for engaging the other side walls of the nut, which may be disposed at right angles to the faces which engage the tongues 13. The end of each tongue 15 acts, therefore, as an abutment to limit the movement of the nut during the inserting operation, so as to effect automatically registration of the opening 11 in the body with the bolt opening in the nut. The body may have spring tabs 16 extending downwardly and inwardly adjacent the ends thereof to provide converging hooks, so that the holder may be pressed or snapped into engagement with spaced openings in the article for positioning the fastener in the desired location with reference to the article.

The nut holder illustrated in Fig. 2 has preferably an arched body 30 corresponding to that shown in Fig. 1, but the nut 21 is held in place by spring tension exerted against the wall of the groove 22, which extend along opposite faces of the nut. To position the nut on the holder, the body of the holder has an opening 31 therein, which is larger than the overall dimensions of the nut, and the opening has a reduced portion, which provides guideways 32 upon which the nut is supported. The holder may also be provided with article-engaging spring tabs 36 at the ends thereof, by means of which it may be snapped into place and held upon the article, as heretofore described, with reference to Fig. 1.

The nut holder 40 illustrated in Figs. 3 and 4 is preferably made from flat stock, which has a bolt-receiving opening 41 in the mid-portion thereof, and which has intermediate portions bent downwardly as at 42 to stand at opposite vertical faces of the nut. The sides 42 are flanged inwardly at their lower ends in downwardly inclined direction, as shown at 43. At the inner ends of the flanges are integral outwardly facing hooks 44 which may engage the walls of a bolt opening 51 in the article, as shown at 50 in Fig. 4. Thus, the holder may be snapped into the aperture and the nut held in place solely under spring pressure. If desired, the body may have a pair of ears 46 extending downwardly from opposite edges for engaging vertical faces of the nut 20 which extend at right angles to those faces which contact the arms 42.

In the form shown in Fig. 3, due to the flare of the sides 42 of the holder and the incline at the flanges 43, the nut, when resting on such inclined flanges, may have its top at a lower level than the extreme lower end of the short downward tongues 46. If so, the nut may be readily slipped into position between the side walls and pass freely beneath the tongue to occupy the position shown in Fig. 3. Then, when the holder with the nut is applied to the support the inward movement of the inclined flanges raises the nut into the position shown in Fig. 4, so that its upper portion stands between the downward tongues 46, which prevent it shifting from place.

When the two side members of the holder in Fig. 3 are forced against the sides of the nut, thereby bringing the hooks toward each other, the hooks still have their points farther apart than the length of the opening 51 in the support 50 to which the device is to be supplied. Accordingly, in putting such holder in place, one hook is passed through the opening in the support, the other hook resting on the face of the support adjacent the opening; but the spring characteristics of the hooks, and the clearance between the bottom of the nut and the inclined flanges of the holder, enables the latter hook to be readily pressed inwardly (as by the point of a screw driver) and sprung sufficiently so that it may pass through the opening, and thus come into the position shown in Fig. 4. Accordingly, with this form, as with the other forms shown, the holder may be entirely preformed, suitable for the reception of the nut between its carrying portions, and then the mounting is effected entirely by spring action without requiring any mechanical bending of the retaining hooks after application.

It will be observed that, in each of the embodiments in my invention, the spring action of the holder holds the nut out of contact with the support when the holder is first applied to the support, and before the bolt has been screwed home; but when the bolt is turned in, to its final position, the nut is thereby drawn toward the support and the holder flattened, so that its spring action tends to force the nut away from the support, thus establishing a frictional stress between the nut threads and the bolt threads, producing a nut-locking action which, in this case, restrains the unscrewing of the bolt.

From the foregoing description, it will be apparent that I have devised a nut holder that can be economically made, and which will operate in a satisfactory manner to position a standard nut placed for receiving a threaded bolt. It will also be apparent that the holder not only holds the nut in bolt receiving position, but also holds it against rotation during the tightening operation and exerts a nut-locking action on the bolt. The invention is further advantageous in that the nut holder may be snapped or pressed into place on the supporting member and is self-retained in bolt-receiving position.

Reference is made to my divisional application, Serial No. 513,867, filed December 11, 1943, for claims directed to the embodiment shown therein in Figs. 1 and 2.

I claim:

1. A fastening device consisting of a nut loosely held within a holder of spring metal shaped to fit across the top of the nut with extensions diverging from two opposite sides toward the bottom face to a lateral fold and thence continuing at an angle substantially more than 90° to the diverging sides under the bottom of the nut toward its bore and terminating in outwardly facing hooks, which can be sprung toward each other and snapped through an aperture in a work sheet so that the nut is resiliently held spaced therefrom to receive a bolt.

2. A fastening device comprising a nut and a spring holder overhanging the top of the nut extending downwardly in flaring directions on opposite sides of the nut and then extending inwardly in an inclined direction beneath the nut and away from it and finally terminating in outwardly facing hooks, the said direction of the parts allowing the hooks to be sprung toward each other after the nut is entrained, whereby they may be passed through an opening in a support and thereafter by the inherent spring action of the holder spread apart to lock the holder to the support and yieldingly retain the nut spaced above the support until the bolt is applied.

GEORGE A. TINNERMAN.